(12) United States Patent
Clarke et al.

(10) Patent No.: US 9,239,025 B2
(45) Date of Patent: Jan. 19, 2016

(54) CONDENSATION DETECTION SYSTEMS AND METHODS

(75) Inventors: David Clarke, Worthing (GB); Anthony Truscott, Worthing (GB); Radek Motal, Prague (CZ)

(73) Assignee: GM Global Technology Operations LLC, Detroit, MI (US)

( * ) Notice: Subject to any disclaimer, the term of this patent is extended or adjusted under 35 U.S.C. 154(b) by 1705 days.

(21) Appl. No.: 12/612,192

(22) Filed: Nov. 4, 2009

(65) Prior Publication Data

US 2010/0332075 A1    Dec. 30, 2010

Related U.S. Application Data

(60) Provisional application No. 61/221,234, filed on Jun. 29, 2009.

(51) Int. Cl.
| | | |
|---|---|---|
| F02D 41/04 | (2006.01) | |
| F02D 41/00 | (2006.01) | |
| F02M 25/07 | (2006.01) | |
| F02M 35/10 | (2006.01) | |

(52) U.S. Cl.
CPC ............ *F02D 41/04* (2013.01); *F02D 41/0072* (2013.01); *F02M 25/0707* (2013.01); *F02M 25/0709* (2013.01); *F02M 25/0748* (2013.01); *F02M 35/10393* (2013.01); *F02D 2200/0418* (2013.01); *F02D 2250/18* (2013.01); *F02M 25/0728* (2013.01); *F02M 25/0731* (2013.01); *Y02T 10/47* (2013.01)

(58) Field of Classification Search
CPC ............ F02D 41/0072; F02D 41/0007; F02D 41/005; F01N 3/0814; F01N 5/02; F03D 41/024; G01N 33/007

USPC ......... 701/35, 33.4, 108; 123/568.15, 568.12, 123/568.22; 60/277, 297; 73/118.1, 29.01, 73/40.7, 114.73, 863.12; 340/507; 236/44 R; 360/75, 568.15; 429/429, 429/524; 62/155; 422/80; 324/663; 290/40 R; 219/497

See application file for complete search history.

(56) References Cited

U.S. PATENT DOCUMENTS

| | | | | |
|---|---|---|---|---|
| 3,678,488 A | * | 7/1972 | Skala | 340/507 |
| 3,771,962 A | * | 11/1973 | Winterhalter et al. | 422/80 |
| 4,147,141 A | * | 4/1979 | Nagano | 123/568.12 |
| 5,070,723 A | * | 12/1991 | Tsou et al. | 73/40.7 |
| 6,062,204 A | * | 5/2000 | Cullen | 123/568.22 |

(Continued)

FOREIGN PATENT DOCUMENTS

EP    0 991 859 B1    7/2002

OTHER PUBLICATIONS

U.S. Appl. No. 12/612,223, filed Nov. 4, 2009, Clarke et al.

(Continued)

*Primary Examiner* — Tuan C. To
*Assistant Examiner* — Yuri Kan (57) ABSTRACT

A condensation monitoring system for a vehicle comprises a humidity estimation module and a condensation detection module. The humidity estimation module estimates a humidity in one of an air intake system and an exhaust gas recirculation (EGR) system associated with an engine of the vehicle. The condensation detection module generates a condensation signal indicating that condensation is present in the one of the air intake system and the EGR system when the humidity is greater than a predetermined humidity.

16 Claims, 5 Drawing Sheets

(56) References Cited

U.S. PATENT DOCUMENTS

| | | | |
|---|---|---|---|
| 2001/0025484 A1* | 10/2001 | Ueno | F01N 3/0814 60/277 |
| 2003/0044655 A1* | 3/2003 | Kato et al. | 429/13 |
| 2003/0056501 A1* | 3/2003 | Ueno | F02D 41/024 60/297 |
| 2003/0115943 A1* | 6/2003 | Ueno | F01N 3/0814 73/114.73 |
| 2003/0117740 A1* | 6/2003 | Mizumoto | 360/75 |
| 2003/0136390 A1* | 7/2003 | Ramamurthy | F02D 41/005 123/568.22 |
| 2004/0050076 A1* | 3/2004 | Palfy et al. | 62/155 |
| 2004/0195343 A1* | 10/2004 | Schmitt et al. | 236/44 R |
| 2005/0021218 A1* | 1/2005 | Bhargava | F02D 41/0007 701/108 |
| 2005/0205550 A1* | 9/2005 | Saito | G01N 33/007 219/497 |
| 2005/0218912 A1* | 10/2005 | Schroeder | 324/663 |
| 2007/0144503 A1* | 6/2007 | Lohmann | F02B 29/0418 123/568.15 |
| 2009/0020106 A1* | 1/2009 | Iijima et al. | 123/568.12 |
| 2009/0127868 A1* | 5/2009 | Yuri | F01N 5/02 290/40 R |
| 2009/0176138 A1* | 7/2009 | Miyauchi et al. | 429/24 |
| 2009/0255350 A1* | 10/2009 | Decker | 73/863.12 |
| 2009/0272176 A1* | 11/2009 | Lopez et al. | 73/29.01 |
| 2010/0332075 A1* | 12/2010 | Clarke et al. | 701/35 |

OTHER PUBLICATIONS

SAE International, 2000-01-0266, "Coordinated EGR-VGT Control for Diesel Engines: an Experimental Comparison", M.J. van Nieuwstadt, I.V. Kolmanovsky and P.E. Moraal, Copyright © 2000 Society of Automotive Engineers, Inc., 14 pages.

SAE International, 2001-01-2006, "Study of Model-based Cooperative Control of EGR and VGT for a Low-temperature, Premixed Combustion Diesel Engine", Takashi Shirawaka, Manabu Miura, Hiroyuki Itoyama, Eiji Aiyoshizawa and Shuji Kimura, Copyright © 2001 Society of Automotive Engineers. Inc., 11 pages.

SAE International, 2003-01-0357, "Model-Based Control of the BGT and EGR in a Turbocharged Common-Rail Diesel Engine: Theory and Passenger Car Implementation", M.Ammann and N.P. Fekete, L.Guzzella and A.H. Glattfelder, Reprinted From: Electronic Engine Controls 2003 (SP-1749), Copyright © 2003 SAE International, 14 pages.

* cited by examiner

CONDENSATION DETECTION SYSTEMS AND METHODS

CROSS-REFERENCE TO RELATED APPLICATIONS

This application claims the benefit of U.S. Provisional Application No. 61/221,234, filed on Jun. 29, 2009. The disclosure of the above application is incorporated herein by reference in its entirety.

This application is related to U.S. application Ser. No. 12/612,223, filed on Nov. 4, 2009, which claims the benefit of U.S. Provisional Application No. 61/221,256, filed on Jun. 29, 2009. The disclosures of the above applications are incorporated herein by reference in their entirety.

FIELD

The present disclosure relates to internal combustion engines and more specifically condensation detection systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

A condensation monitoring system for a vehicle comprises a humidity estimation module and a condensation detection module. The humidity estimation module estimates a humidity in one of an air intake system and an exhaust gas recirculation (EGR) system associated with an engine of the vehicle. The condensation detection module generates a condensation signal indicating that condensation is present in the one of the air intake system and the EGR system when the humidity is greater than a predetermined humidity.

In other features, the condensation monitoring system further comprises a water estimation module. The water estimation module estimates a fraction of water in the gas. The humidity estimation module estimates the humidity based on the fraction of water, a pressure in the system, and a saturated vapor pressure of the gas.

In still other features, the humidity estimation module estimates the humidity based on a product of the fraction of water and a quotient of the pressure and the saturated vapor pressure.

In further features, the condensation monitoring system further comprises a carbon dioxide ($CO_2$) determination module. The $CO_2$ determination module determines a second fraction of $CO_2$ in the gas, and a third fraction of $CO_2$ in ambient air. The water estimation module estimates a fourth fraction of water in the ambient air and estimates the fraction of water in the gas based on the second, third, and fourth fractions.

In still further features, the water estimation module estimates the fraction of water in the gas further based on a ratio of hydrogen to carbon in fuel provided to the engine for combustion.

In other features, the condensation detection module alters a predetermined location in memory corresponding to the one of the air intake system and the EGR system when the humidity is greater than the predetermined humidity.

In still other features, the humidity estimation module estimates a first humidity at a first location between an EGR cooler and a EGR valve of the EGR system, a second humidity at a second location near an inlet of a turbocharger compressor, and a third humidity at a third location near an outlet of an aftercooler. The condensation detection module generates the condensation signal when at least one of the first, second, and third humidities is greater than the predetermined humidity.

In further features, the condensation detection module alters a predetermined location in memory corresponding to one of the first, second, and third locations when one of the first, second, and third humidities is greater than the predetermined humidity, respectively.

A condensation monitoring system for a vehicle comprises a humidity estimation module and a condensation detection module. The humidity estimation module estimates humidity in a system that provides a gas to an engine of the vehicle. The condensation detection module that generates a condensation signal indicating that condensation is present in the system when the humidity is greater than a predetermined humidity.

In other features, the humidity estimation module estimates the humidity in an intake system associated with the engine.

In still other features, the humidity estimation module estimates the humidity in an exhaust gas recirculation system that circulates exhaust gas produced by the engine back to the engine.

A condensation monitoring method for a vehicle, comprises: estimating a humidity in one of an air intake system and an exhaust gas recirculation (EGR) system associated with an engine of the vehicle; and generating a condensation signal indicating that condensation is present in the one of the air intake system and the EGR system when the humidity is greater than a predetermined humidity.

In other features, the condensation monitoring method further comprises estimating a fraction of water in the gas and estimating the humidity based on the fraction of water, a pressure in the system, and a saturated vapor pressure of the gas.

In still other features, the condensation monitoring method further comprises estimating the humidity based on a product of the fraction of water and a quotient of the pressure and the saturated vapor pressure.

In further features, the condensation monitoring method further comprises determining a second fraction of $CO_2$ in the gas, and a third fraction of $CO_2$ in ambient air and estimating a fourth fraction of water in the ambient air and estimates the fraction of water in the gas based on the second, third, and fourth fractions.

In still further features, the condensation monitoring method further comprises estimating the fraction of water in the gas further based on a ratio of hydrogen to carbon in fuel provided to the engine for combustion.

In other features, the condensation monitoring method further comprises altering a predetermined location in memory corresponding to the one of the air intake system and the EGR system when the humidity is greater than the predetermined humidity.

In still other features, the condensation monitoring method further comprises: estimating a first humidity at a first location between an EGR cooler and a EGR valve of the EGR system; estimating a second humidity at a second location near an inlet of a turbocharger compressor; estimating a third humidity at a third location near an outlet of an aftercooler; and generating the condensation signal when at least one of the first, second, and third humidities is greater than the predetermined humidity.

In further features, the condensation monitoring method further comprises altering a predetermined location in memory corresponding to one of the first, second, and third locations when one of the first, second, and third humidities is greater than the predetermined humidity, respectively.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

Cooling of a (relatively) warm gas or gas mixture in an engine system may cause condensation. For example, warm exhaust gas recirculated back to an engine may be mixed with cooler air being drawn into the engine. The temperature of the resulting mixture of air and exhaust gas may be below the dew point of the air/exhaust gas mixture. Condensation may therefore be present in the engine system near where the mixing occurs near and downstream of that location. Condensation may cause corrosion and/or erosion of components that are contacted by the condensation.

A condensation module according to the present disclosure estimates the relative humidity of gas (e.g., air or air/exhaust gas mixture) within the engine system where condensation may be present. The condensation module compares the relative humidity at a given location with a predetermined relative humidity and indicates that condensation is likely present at the location when the relative humidity is greater than the predetermined humidity.

Figure 1A:
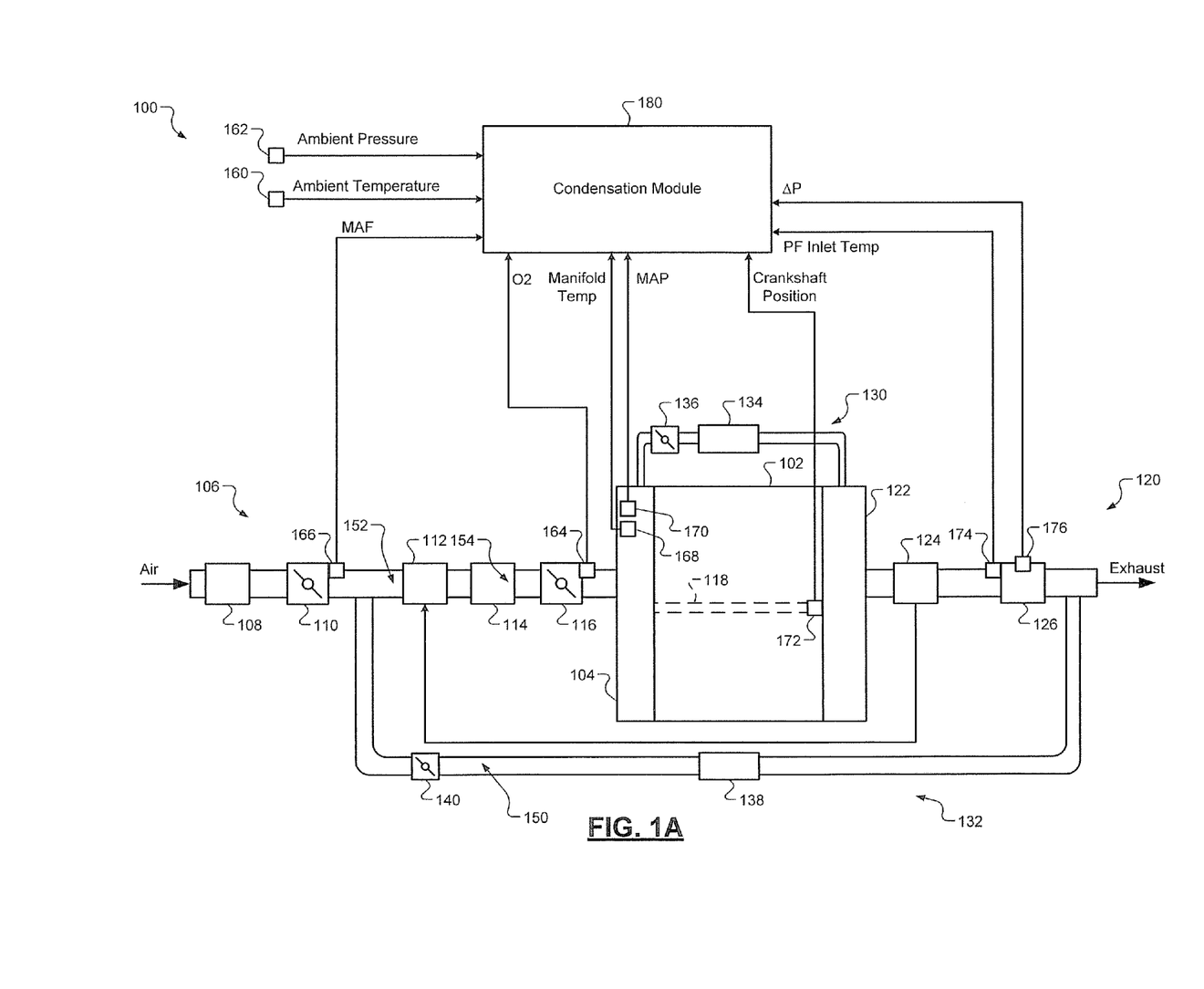
FIGS. 1A-1B are functional block diagrams of exemplary engine systems according to the principles of the present disclosure.

Referring now to FIG. 1A, a functional block diagram of an exemplary engine system 100 is presented. The engine system 100 includes an engine 102 that combusts an air/fuel mixture within one or more cylinders (not shown) to produce drive torque for a vehicle. The engine system 100 may be a diesel engine system or another suitable type of engine system. One or more electric motors (not shown) may also be implemented with the engine system 100. Air is drawn into the engine 102 through an intake manifold 104. More specifically, air is drawn into the intake manifold 104 via an intake system 106.

The intake system 106 includes an air filter 108, a first throttle valve 110, a turbocharger compressor 112, an aftercooler 114, and a second throttle valve 116. While not specifically recited, the intake system 106 also includes connecting devices (e.g., pipes) that connect the components of the intake system 106 together. Air being drawn into the intake manifold 104 may encounter the components of the intake system 106 in the following order: first, the air filter 108; second, the first throttle valve 110; third, the turbocharger compressor 112; fourth, the aftercooler 114; fifth, the second throttle valve 116; and sixth, the intake manifold 104.

Opening of the first throttle valve 110 is regulated to control the flow of air through the first throttle valve 110. The turbocharger compressor 112 receives air and compresses the air. The turbocharger compressor 112 provides a compressed air charge to the aftercooler 114. The compression of the air generates heat. The aftercooler 114 cools the compressed air and provides the cooled compressed air to the second throttle valve 116. Opening of the second throttle valve 116 is regulated to control the flow of the cool compressed air into the intake manifold 104.

Gas from the intake manifold 104 (e.g., air or an air/exhaust gas mixture) is drawn into the one or more cylinders of the engine 102. Fuel is mixed with the air to form an air/fuel mixture. For example only, the fuel may be injected directly into each cylinder of the engine 102. In other engine systems, the fuel may be injected into the intake manifold 104 or another suitable location. Combustion of the air/fuel mixture drives a rotating crankshaft 118, thereby generating torque.

The byproducts of combustion are exhausted from the engine 102 to an exhaust system 120. The exhaust system 120 includes an exhaust manifold 122, a turbocharger impeller 124, and a particulate filter (PF) 126. While not specifically recited, the exhaust system 120 also includes connecting devices (e.g., pipes) that connect the components of the exhaust system 120 together. Exhaust gas traveling through the exhaust system 120 may encounter the components of the exhaust system 120 in the following order: first, the exhaust manifold 122; second, the turbocharger impeller 124; and third, the PF 126.

The flow of the exhaust gas drives rotation of the turbocharger impeller 124. The turbocharger impeller 124 is linked to the turbocharger compressor 112, and the rotation of the turbocharger impeller 124 drives rotation of the turbocharger compressor 112. In some implementations, the turbocharger impeller 124 may include a variable geometry turbocharger (VGT), a variable nozzle turbocharger (VNT), or another suitable type of turbocharger. The PF 126 filters various components of the exhaust gas from the exhaust gas (e.g., soot). For example only, the PF 126 may include a diesel particulate filter (DPF).

The engine system 100 also includes a first exhaust gas recirculation (EGR) system 130 and a second EGR system 132. The first EGR system 130 controls circulation of exhaust gas from the exhaust manifold 122 back to the intake manifold 104. In this manner, the first EGR system 130 provides exhaust gas back to the intake manifold 104 to be re-introduced to the engine 102. Recirculating exhaust gas back to the engine 102 for combustion produces lower combustion temperatures which, in turn, produces exhaust gas having lower concentrations of nitrogen oxides (NOx).

The first EGR system 130 includes a first EGR cooler/cooler bypass 134 and a first EGR valve 136. While not specifically recited, the first EGR system 130 also includes connecting devices (e.g., pipes) that connect the components of the first EGR system 130 together. Exhaust gas flows through the first EGR system 130 to the first EGR cooler/cooler bypass 134.

The first EGR cooler/cooler bypass 134 includes an EGR cooler and a cooler bypass (not shown). The EGR cooler cools exhaust gas flowing through the EGR cooler. The cooler bypass allows exhaust gas to bypass the EGR cooler. Opening of the first EGR valve 136 is regulated to control the flow of the exhaust gas back to the intake manifold 104 from the exhaust manifold 122. The first EGR system 130 may be referred to as a short route (SR) EGR system as the path taken by exhaust gas back to the intake manifold 104 is shorter than the path taken by exhaust gas through the second EGR system 132.

The second EGR system 132 controls circulation of exhaust gas from downstream of the PF 126 to upstream of the turbocharger compressor 112. In this manner, the second EGR system 132 provides exhaust gas back to the turbocharger compressor 112 to be compressed with fresh air flowing through the first throttle valve 110.

The second EGR system 132 includes a second EGR cooler/cooler bypass 138 and a second EGR valve 140. Exhaust gas flows through the second EGR system 132 to the second EGR cooler/cooler bypass 138. While not specifically recited, the second EGR system 132 also includes connecting devices (e.g., pipes) that connect the components of the second EGR system 132 together. The second EGR cooler/cooler bypass 138 includes an EGR cooler and a cooler bypass (not shown).

The EGR cooler cools exhaust gas flowing through the EGR cooler. The cooler bypass allows exhaust gas to bypass the EGR cooler. Opening of the second EGR valve 140 is regulated to control the flow of the exhaust gas back to upstream of the turbocharger compressor 112. The second EGR system 132 may be referred to as a long route (LR) EGR system as the path taken by exhaust gas back to upstream of the turbocharger compressor 112 is longer than the path taken by exhaust gas through the first EGR system 130.

Figure 1B:
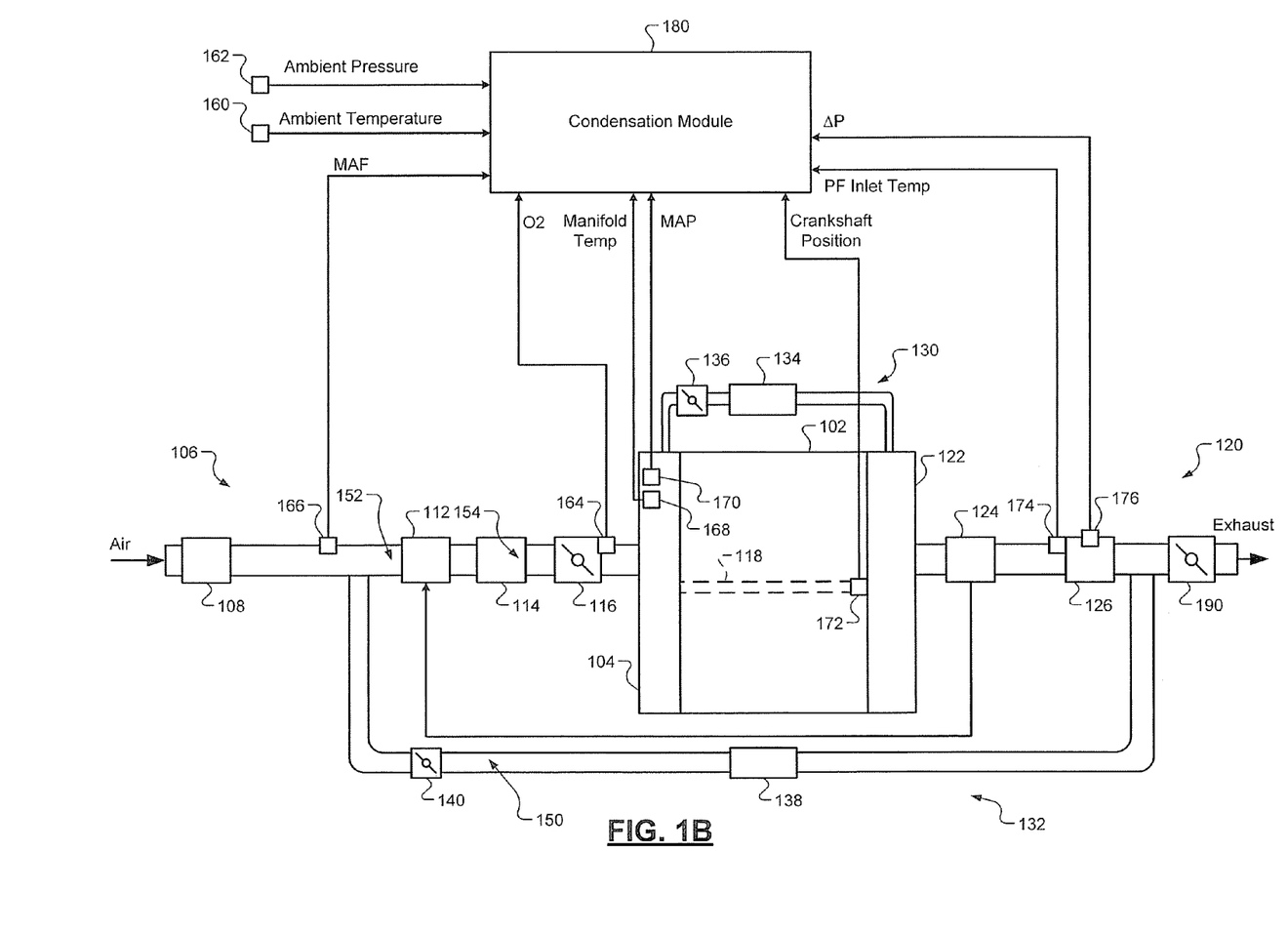

In some implementations, the first throttle valve 110 may be omitted. For example only, the first throttle valve 110 is shown as being omitted in the exemplary embodiment of FIG. 1B. In such implementations, a back-pressure valve 190 may be implemented downstream of the second EGR system 132 to restrict the flow of exhaust exiting the exhaust system 120 and increase the pressure upstream of the back pressure valve 190.

Cooling of various (relatively) warm gas(ses) throughout the engine system 100 may cause condensation at various locations or areas in the engine system 100. In the exemplary embodiment of FIG. 1, condensation may potentially be found at three locations: a first potential condensation location 150, a second potential condensation location 152, and a third potential condensation location 154. Condensation may cause corrosion and erosion of various components of the engine system 100 that are contacted by condensation.

The first potential condensation location 150 includes locations between the second EGR cooler/cooler bypass 138 and the second EGR valve 140. Cooling of exhaust gas passing through the EGR cooler of the second EGR cooler/cooler bypass 138 may lower the temperature of the exhaust gas to below the dew point of the exhaust gas. The lowering of the temperature to or below the dew point may cause condensation which may be carried to the first potential condensation location 150.

The second potential condensation location 152 includes locations between the turbocharger compressor 112 and where the second EGR system 132 connects to the intake system 106. Fresh air being drawn through the first throttle valve 110 mixes with (relatively) warm exhaust gas from the second EGR valve 140. The temperature of the fresh air/exhaust gas mixture may be less than the dew point of the mixture. Accordingly, condensation may be found at locations between the turbocharger compressor 112 and where the second EGR system 132 connects to the intake system 106.

The third potential condensation location includes locations within the aftercooler 114 and, more specifically, near an outlet of the aftercooler 114. The aftercooler 114 may cool the gas (e.g., air or air/exhaust gas mixture) to temperatures that are less than the dew point of the gas. Accordingly, condensation may be found at locations within the aftercooler 114 and near the outlet.

One or more sensors may be implemented throughout the engine system 100 to measure operating parameters. For example only, the engine system 100 may include an ambient air temperature sensor 160, an ambient pressure sensor 162, an oxygen (i.e., lambda) sensor 164, a mass airflow (MAF) sensor 166, a manifold temperature sensor 168, and a manifold absolute pressure (MAP) sensor 170.

The ambient air temperature sensor 160 measures the temperature of ambient air and generates an ambient air temperature signal accordingly. In some implementations, intake air temperature (IAT) may be used as an indicator of the ambient air temperature. The ambient pressure sensor 162 measures pressure of the ambient (i.e., atmospheric) air and generates an ambient pressure signal accordingly. The oxygen sensor 164 measures the oxygen content of the gas flowing through the second throttle valve 116 and generates an O2 signal accordingly. The MAF sensor 166 measures mass flowrate of air through the first throttle valve 110 and generates a MAF signal accordingly.

The manifold temperature sensor 168 measures temperature within the intake manifold 104 and generates a manifold temp signal accordingly. The MAP sensor 170 measures absolute pressure within the intake manifold 104 and generates the MAP signal accordingly. In some implementations, engine vacuum may be measured, where engine vacuum is the difference between the MAP and the ambient air pressure.

The engine system 100 may also include a crankshaft position sensor 172, a PF inlet temperature sensor 174, and a pressure difference sensor 176. The crankshaft position sensor 172 monitors the position of the crankshaft 118 and outputs a crankshaft position signal accordingly. The crankshaft position signal may be used to determine the rotational speed of the engine 102 (i.e., engine speed). The PF inlet temperature sensor 174 measures the temperature of exhaust gas near an inlet of the PF 126 and generates a PF inlet temp signal accordingly. The pressure difference sensor 176 measures the difference in pressure across the PF 126 and generates a pressure difference (ΔP) signal accordingly. In some implementations, the operating parameters that would be measured by a sensor may instead be estimated or provided by another suitable source.

A condensation module 180 according to the present disclosure estimates the relative humidity of the gas (e.g., air or air/exhaust gas mixture) at the potential condensation locations 150-154. The condensation module 180 determines whether condensation is likely present at a given location based on a comparison of the relative humidity at the location with a predetermined relative humidity. The predetermined relative humidity corresponds to a relative humidity above which condensation will likely be present at the location.

Figure 2:
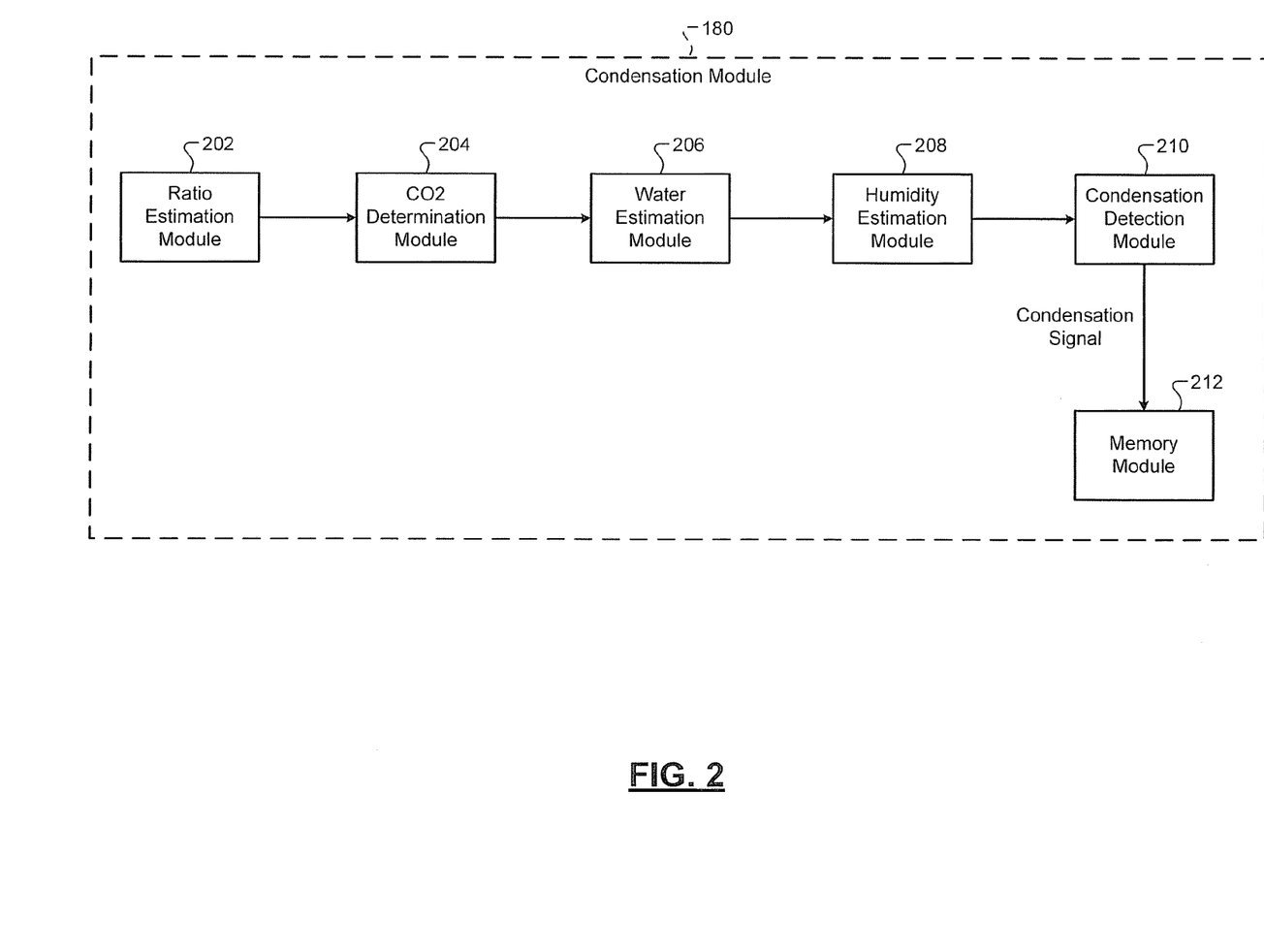
FIG. 2 is a functional block diagram of an exemplary engine control system according to the principles of the present disclosure.

Referring now to FIG. 2, a functional block diagram of an exemplary implementation of the condensation module 180 is presented. The condensation module 180 includes a ratio estimation module 202, a carbon dioxide (CO2) determination module 204, a water estimation module 206, a humidity estimation module 208, and a condensation detection module 210.

The ratio estimation module 202 estimates a molar ratio (MR) of oxygen (MR O2), a molar ratio of exhaust gas (MR EGR), and a molar ratio of exhaust gas attributable to exhaust gas from the second EGR system 132 (MR EGR LR). Use of LR is indicative of the second (i.e., long route) EGR system 132, and use of SR is indicative of the first (i.e., short route) EGR system 130.

Figure 3:
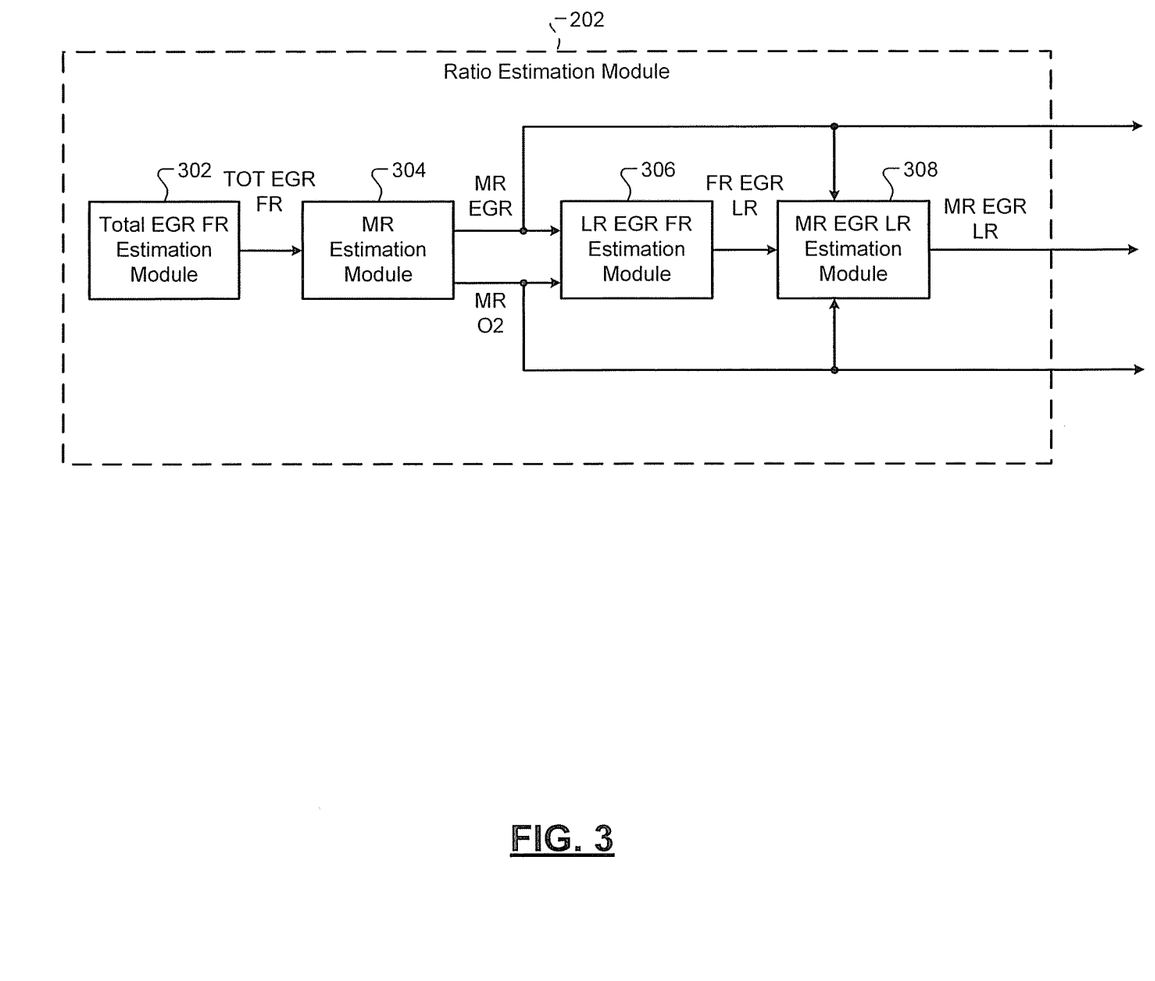
FIG. 3 is a functional block diagram of an exemplary ratio estimation module according to the principles of the present disclosure.

FIG. 3 is a functional block diagram of an exemplary implementation of the ratio estimation module 202. As shown in FIG. 3, the ratio estimation module 202 includes a total EGR flowrate (FR) estimation module 302, a MR estimation module 304, a long route (LR) EGR FR estimation module 306, and a MR EGR LR estimation module 308.

The total EGR FR estimation module 302 estimates a total flowrate of exhaust gas provided to the engine 102 (TOT EGR FR). The total EGR FR estimation module 302 estimates the total EGR flowrate based on the MAF and a total flowrate of gas into the engine 102 (W IN). For example only, the total EGR FR estimation module 302 may estimate the total EGR flowrate using the equation:

$$TOT\ EGR\ FR = \frac{W\ IN - MAF}{W\ IN}, \quad (1)$$

where: TOT EGR FR is the total EGR flowrate (kg/s); W IN is the total flowrate into the engine 102 (kg/s); and MAF is the MAF (kg/s). The total flowrate into the engine 102 (i.e., W IN) may be estimated using the equation:

$$W\ IN = \eta * \frac{P}{R*T} * V * \frac{N}{120}, \quad (2)$$

where: η is the volumetric efficiency of the engine 102 (0-1); P is the pressure within the intake manifold 104 (Pa) (e.g., the MAP); R is the gas constant (J/Kg/K); T is the manifold temperature (K); V is the displacement of the engine 102 (cubic meters); and N is engine speed (rpm). The volumetric efficiency of the engine 102 (i.e. η), may be estimated using the equation:

$$\eta = \sqrt{\frac{T}{T\ Ref}} * f(P, N), \quad (3)$$

where T Ref is a reference intake manifold temperature and f denotes use of a function.

The MR estimation module 304 estimates the molar ratio of exhaust gas and the molar ratio of oxygen. The chemical balance equation for complete combustion of a mixture of air, hydrocarbon fuel, and exhaust gas may be represented as:

$$CH_n + MR\ O2[O_2 + x*N_2 + y*CO_2 + z*H_2O] + MR\ EGR\ [a*CO_2 + c*H_2O + e*O_2 + h*N_2] \rightarrow a*CO_2 + c*H_2O + e*O_2 + h*N_2, \quad (4)$$

where: N is Nitrogen (N2 includes other inert compounds); C is Carbon; H is Hydrogen; and O is Oxygen. Coefficients a, c, e, and h may be determined by reducing the chemical balance equation (4) above once the molar ratios of oxygen and exhaust gas have been determined. For example only, the coefficients a, c, e, and h may be determined using the equations:

$$a = \frac{1 + MR\ O2 * y}{1 - MR\ EGR}, \quad (5)$$

$$c = \frac{\left(\frac{n}{2}\right) + MR\ O2 * z}{1 - MR\ EGR}, \quad (6)$$

$$e = \frac{MR\ O2 - 1 - \frac{n}{4}}{1 - MR\ EGR}, \text{ and} \quad (7)$$

$$h = \frac{MR\ O2 * x}{1 - MR\ EGR}, \quad (8)$$

where x is the molar ratio of $N_2$ to $O_2$ in air, y is the molar ratio of $CO_2$ to $O_2$ in air, and n is the molar ratio of H to C in the fuel injected. x, y, and n may be predetermined values and may be approximately equal to 3.7, 0.00174, and 1.87, respectively. z may be obtained using the equation:

$$z = \frac{(1 + x + y) * [H2O]\ Air}{1 - [H2O]\ Air}, \quad (9)$$

where [H2O]Air is the fraction (e.g., molar or volumetric) of water in the ambient air. The fraction of water in the air may be determined using an ambient RH sensor, the ambient pressure, and the ambient temperature.

The MR estimation module 304 estimates the molar ratio of oxygen based on the gravimetric ratio of the air/fuel mixture provided to the engine 102. For example only, the MR estimation module 304 may estimate the molar ratio of oxygen (i.e., MR $O_2$) using the equation:

$$MR\ O2 = \frac{GR * MCH}{(MO_2 + x * MN_2 + y * MCO_2 + z * MH_2O)}, \quad (10)$$

where: GR is the gravimetric ratio of the air/fuel mixture; $MO_2$ is the molar mass of oxygen (kg/mol); $MN_2$ is the molar mass of nitrogen (kg/mol); $MCO_2$ is the molar mass of carbon dioxide (kg/mol); $MH_2O$ is the molar mass of water (kg/mol); and MCH is the molar mass of the fuel (kg/mol).

The MR estimation module 304 may estimate the molar ratio of exhaust gas based on the total EGR flowrate (e.g., see equation (1)) and the molar ratio of oxygen (e.g., see equation (10)). For example only, the MR estimation module 304 may estimate the molar ratio of exhaust gas (i.e., MR EGR) using the equation:

$$(1 - TOT\ EGR\ FR) * \begin{bmatrix} (1 + MR\ O2 * y) * MCO_2 + \\ \left(\frac{n}{2} + MR\ O2 * z\right) * MH_2O \end{bmatrix} \over TOT\ EGR\ FR * MR\ O2 * \\ (MO_2 + x * MN_2 + y * MCO_2 + z * MH_2O) +$$

$$\frac{(1 - TOT\ EGR\ FR) * \left[\left(MR\ O2 - 1 - \frac{n}{4}\right) * \frac{MO_2 + MR\ O2 * x * MN_2}{TOT\ EGR\ FR * MR\ O2 *} \right]}{(MO_2 + x * MN_2 + y * MCO_2 + z * MH_2O)} + 1 \quad (11)$$

where MR EGR is equal to the multiplicative inverse of the result of equation (11). In other words, MR EGR=result of equation $(11)^{-1}$.

The LR EGR FR estimation module 306 estimates a flowrate of the exhaust gas provided by the second (i.e., long route) EGR system 132 (FR EGR LR). For example only, the LR EGR FR estimation module 306 may estimate the flowrate of the exhaust gas provided by the second EGR system 132 (i.e., FR EGR LR) using the equation:

$$FR\ EGR\ LR = \frac{W\ LR\ EGR}{MAF + W\ LR\ EGR}, \quad (12)$$

where W LR EGR is the total flowrate of exhaust gas through the second EGR valve 140 (kg/s). The total flowrate of exhaust gas through the second EGR valve 140 (i.e., W LR EGR) may be estimated using the equation:

$$W\ LR\ EGR = A\ EGR2 * \frac{P\ Amb}{\sqrt{TEGR\ C2}} * f_T\left(\frac{P\ Precomp}{P\ Amb}\right), \quad (13)$$

where: A EGR 2 is the effective area (square meters) of the second EGR valve 140 and the second EGR cooler/cooler bypass 138; P Amb is the ambient pressure (Pa); T EGR C 2 is the temperature near the outlet of the second EGR cooler/cooler bypass 138 (K); P Precomp is the pressure upstream of the turbocharger compressor 112 (Pa); and $f_T$ indicates use of the standard orifice flow function (e.g., see equations (15)-(16)). The pressure upstream of the turbocharger compressor 112 (i.e., P Precomp) may be determined using the equation:

$$P\ Precomp = f_{IT}\left(\frac{MAF * \sqrt{T\ Amb}}{A\ In}, P\ Amb\right), \quad (14)$$

where: $f_{IT}$ indicates use of the inverted throttle function; A In is the effective area of the air filter 108 and the first throttle valve 110; T Amb is the ambient temperature (K); and P Amb is the ambient pressure (Pa). In some implementations, the inverted throttle function may be derived iteratively offline based on the standard orifice isentropic flow model. The standard orifice flow function through a given orifice may be described by the equations:

$$f_T\left(\frac{P2}{P1}\right) = \sqrt{\left(\frac{2*\gamma}{R*(\gamma-1)}\right) * \left[\left(\frac{P2}{P1}\right)^{\frac{2}{\gamma}} - \left(\frac{P2}{P1}\right)^{\frac{\gamma+1}{\gamma}}\right]}, \quad (15)$$

where $\left(\frac{P2}{P1}\right) > PR\ Crit$; and $$f_T\left(\frac{P2}{P1}\right) = \sqrt{\left(\frac{\gamma}{R}\right)*\left(\frac{2}{\gamma+1}\right)^{\left(\frac{\gamma+1}{\gamma-1}\right)}}, \text{ where } \left(\frac{P2}{P1}\right) \leq PR\ Crit \quad (16)$$

where: P1 is a first pressure upstream of the orifice; P2 is a second pressure downstream of the orifice; PR Grit is a critical pressure ratio; γ is the ratio of specific heats; and R is the gas constant. The critical pressure ratio (i.e., PR Crit) may be determined using the equation:

$$PR\ Crit = \left(\frac{2}{\gamma+1}\right)^{\left(\frac{\gamma}{\gamma-1}\right)}. \quad (17)$$

The total amount of exhaust gas circulated back to the intake manifold 104 is provided by the combination of the first EGR system 130 and the second EGR system 132. The total EGR flowrate (i.e., TOT EGR FR) can therefore be expressed as a sum of the flowrate of the exhaust gas provided by the second EGR system 132 (i.e., FR EGR LR) and a flowrate of exhaust gas provided by the first (i.e., short route) EGR system 130. Written as an equation:

TOT EGR FR=SR EGR FR+LR EGR FR (18)

where SR EGR FR is the flowrate of exhaust gas provided by the first (i.e., short route) EGR system 130.

Similar to how the molar ratio of exhaust gas may be estimated based on the total EGR flowrate (e.g., see equation (11)), the molar ratio of the exhaust gas provided by the second EGR system 132 (MR EGR LR) can be estimated from the flowrate of the exhaust gas provided by the second EGR system 132 (i.e., FR EGR LR). For example only, the MR EGR LR estimation module 308 may estimate the molar ratio of the exhaust gas provided by the second EGR system 132 (i.e., MR EGR LR) using the equation:

$$MG\ EGR\ LR = \left(\frac{FR\ EGR\ LR}{1 - FR\ EGR\ LR}\right) * \quad (19)$$
$$\left[\frac{MR\ O2*(MO_2 + x*MN_2 + y*MCO_2 + z*MH_2O)}{(a*MCO_2 + c*MH_2O + e*MO_2 + h*MN_2)}\right].$$

The MR EGR, the MR $O_2$, and the MR EGR LR are provided to the CO2 estimation module as shown in FIG. 2.

Referring back to FIG. 2, the CO2 determination module 204 determines the fraction (e.g., molar or volumetric fraction) of carbon dioxide in the gas at each of the potential condensation locations 150-154. For the first potential condensation location 150 (i.e., between the second EGR cooler/cooler bypass 138 and the second EGR valve 140), the carbon dioxide fraction may be determined using the equation:

$$CO2\ L1 = \frac{1 + MR\ O2 * y}{MR\ O2(1 + x + y + z) + \left(\frac{n}{4}\right)}, \quad (20)$$

where CO2 L1 is the fraction of carbon dioxide at the first potential condensation location 150.

For the second potential condensation location 152 (i.e., between the turbocharger compressor 112 and where the second EGR system 132 connects to the intake system 106), the carbon dioxide fraction may be determined using the equation:

$$CO2\ L2 = \frac{MR\ O2 * y + MR\ EGR\ LR * a}{MR\ O2(1 + x + y + z) + MR\ EGR\ LR * (a + c + e + h)}, \quad (21)$$

where CO2 L2 is the fraction of carbon dioxide at the second potential condensation location 152. For the third potential condensation location 154 (i.e., near the outlet of the aftercooler 114), the carbon dioxide fraction will be equal to the carbon dioxide fraction at the second potential condensation location 152 (i.e., CO2 L2) assuming steady-state flow.

The water estimation module 206 estimates the fraction (e.g., molar or volumetric fraction) of water in the gas at each of the potential condensation locations 150-154. At a given location, the fraction of water may be estimated using the equation:

$$[H2O]IN = [H2O]Air + \left[\frac{\frac{n}{2} * \left(1 - \frac{[H2O]\ Air}{2}\right) * ([CO2]IN - [CO2]Air)}{\left(1 - \frac{n}{4} * [CO2]\ Air\right)}\right], \quad (22)$$

where [H2O]IN is the fraction of water in the gas at the given location, [H2O]Air is the fraction of water in the air, [CO2]IN is the fraction of carbon dioxide in the gas at the location, and [CO2]Air is the fraction of carbon dioxide in the air. The fraction of carbon dioxide in the gas (i.e., [CO2]Air) may be estimated using the equation:

$$[CO2]\ Air = \frac{y}{1 + x + y + z}. \quad (23)$$

The humidity estimation module 208 estimates relative humidity of the gas at each of the potential condensation locations 150-154 based on the fraction of water in the gas at each of the potential condensation locations 150-154. The humidity estimation module 208 may estimate the relative humidity (RH) at a given location (i.e., RH IN) using the equation:

$$RH\ IN = [H2O]IN * \frac{P\ IN}{P\ Sat}, \quad (25)$$

where RH IN is the relative humidity at the location (0-1), P IN is the pressure at the given location (Pa), and P Sat is the saturated vapor pressure at the given location (Pa). The saturated vapor pressure at the given location may be estimated using the equation:

$$PSat = 10^{\left(2.78571 + \frac{7.502*(T-T0)}{237.3 + T - T0}\right)}, \quad (26)$$

where T is the temperature of the gas at the given location and T0 is a predetermined conversion temperature (e.g., 273.15 K).

In some implementations, the temperature and/or pressure may be measured at each of the potential condensation locations 150-154. In other implementations, the temperature and/or pressure may be estimated. For example only, the pressure at the first potential condensation location 150 may be assumed to be equal to the ambient air pressure.

The temperature at the first potential condensation location 150 may be estimated based on the inlet temperature of the PF 126. For example only, the temperature at the first potential condensation location 150 (i.e., TPCL1) may be estimated using the equation:

$$TPCL1 = TPFOut - \epsilon_{ERGC}(TPFOut - TCoolant), \quad (27)$$

where, TPFOut is the temperature at the outlet of the PF 126 (K), $\epsilon_{EGRC}$ is the effectiveness of the second EGR cooler/cooler bypass 138 (0-1), and TCoolant is the temperature of the coolant flowing through the EGR cooler (K).

The pressure at the second potential condensation location 152 (i.e., P Precomp) may be estimated using equation (14), as described above. The temperature at the second potential condensation location 152 (i.e., T Precomp) may be estimated using the equation:

$$T\ Precomp = \frac{MAF * T\ Amb + W\ LR\ EGR * T\ EGR\ C2}{MAF + W\ LR\ EGR}, \quad (28)$$

where W LR EGR is the total flowrate of exhaust gas through the second EGR valve 140 (kg/s), T Amb is the ambient air temperature (K), and T EGR C2 is the temperature near an outlet of the second EGR cooler/cooler bypass 138 (K).

The temperature at the third potential condensation location 154 (i.e., TPCL3) may be estimated using the equation:

$$TPCL3 = TCompOut - \epsilon_{AC} * (TCompOut - TACCoolant), \quad (29)$$

where TPCL3 is the temperature at the third potential condensation location 154 (K), TCompOut is the temperature near the outlet of the turbocharger compressor 112 (K), $\epsilon_{AC}$ is the effectiveness of the aftercooler 114 (0-1), and TACCoolant is the temperature of the coolant flowing through the aftercooler 114 (K). The TCompOut may be estimated using the equation:

$$TCompOut = TPCL2 * \left\{ \frac{1 + \frac{1}{\eta Comp} *}{\left[\left(\frac{PAc}{PPrecomp}\right)^{\frac{\gamma-1}{\gamma}} - 1\right]} \right\}, \quad (30)$$

where PAc is the pressure of the aftercooler 114 (Pa), γ is the ratio of specific heats, and η is the isentropic efficiency of the turbocharger compressor 112. The isentropic efficiency of the turbocharger compressor 112 (i.e., ηComp) may be estimated from the map of the efficiency of the turbocharger compressor 112 function ($f_{CE}$):

$$\eta Comp = f_{CE}\left(\frac{PAc}{PPrecomp}, \frac{WComp * \sqrt{TPLC2}}{PPrecomp}\right). \quad (31)$$

The pressure at the third potential condensation location 154 (i.e., PAc) may be estimated using the differential equation:

$$\frac{dPAc}{dt} = \frac{\gamma * R}{VAc} * (WComp * TPCL3 - WTV2 * TAcOutTR), \quad (32)$$

where VAc is the volume of the aftercooler 114 (cubic meters), WComp is the flowrate through the turbocharger compressor 112 (kg/s), WTV2 is the flowrate through the second throttle valve 116 (kg/s) and TAcOutTR is the transient temperature near the outlet of the aftercooler 114. At wide open throttle, the PAc may be set equal to the MAP. The TAcOutTR includes the effects of transport delays through the turbocharger compressor 112 and may be calculated from the perfect gas law.

The condensation detection module 210 detects whether condensation is likely present at each of the potential condensation locations 150-154 based on a comparison of a predetermined relative humidity and the relative humidity at the respective potential condensation locations 150-154. The predetermined relative humidity corresponds to a relative humidity above which condensation will likely be present at a given location. The predetermined relative humidity may be calibratable and may be set to, for example, approximately 0.7. In some implementations, the predetermined relative humidity may vary from location to location. The condensation detection module 210 determines that condensation is present at a given location when the relative humidity at the location is greater than the predetermined relative humidity.

The condensation detection module 210 generates a condensation signal that indicates whether condensation is likely present. The condensation signal may carry data for each of the potential condensation locations 150-154 or a condensation signal may be generated for each of the potential condensation locations 150-154.

The condensation signal may be used to set a flag or code in a predetermined location in a memory module 212. A module or system that takes remedial action when condensation is detected may periodically check the memory module 212 or receive the condensation signal to determine whether condensation has been detected and take the remedial action when condensation has been detected. The condensation detection module 210 may also take one or more other remedial actions.

Figure 4:
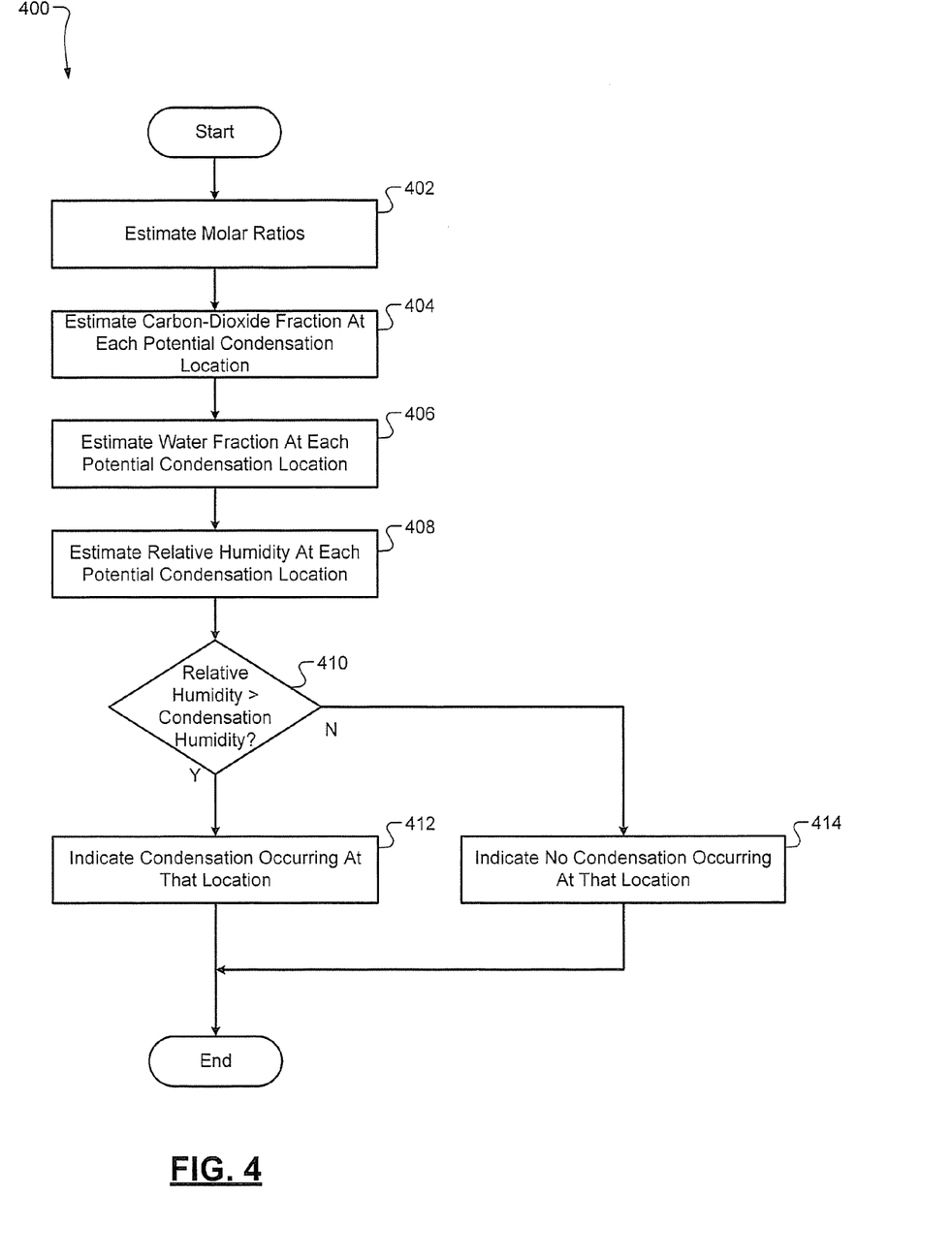
FIG. 4 is a flowchart depicting exemplary steps performed by a method according to the principles of the present disclosure.

Referring now to FIG. 4, a flowchart depicting exemplary steps performed by a method 400 is presented. The method 400 begins in step 402 where the method 400 estimates molar ratios. The method 400 estimates molar ratios of oxygen and exhaust gas provided to the engine 102 and the molar ratio of exhaust gas provided by the second EGR system 132.

The method 400 estimates the carbon dioxide fraction in the gas at each of the potential condensation locations 150-154 in step 404. The method 400 estimates the fraction of water in the gas at each of the potential condensation locations 150-154 in step 406. In step 408, the method 400 estimates the relative humidity at each of the potential condensation locations 150-154.

In step 410, the method 400 determines whether the relative humidity at one or more of the potential condensation locations 150-154 is greater than the predetermined relative humidity. If true, the method 400 indicates that condensation is likely occurring at that location in step 412 and ends. If false, the method 400 indicates that condensation is not likely present in step 414 and ends. The predetermined relative humidity may be calibratable and may be set to, for example, approximately 0.7. In some implementations, the predetermined relative humidity may vary between potential condensation locations. When indicating whether condensation is occurring, the method 400 may, for example, generate the condensation signal and set a code, flag, or other indicator in a predetermined location in memory corresponding to location where condensation is likely present.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A condensation monitoring system for a vehicle, comprising:
   a humidity estimation module that estimates a humidity in one of an air intake system and an exhaust gas recirculation (EGR) system associated with an engine of the vehicle; and
   a condensation detection module that generates a condensation signal indicating that condensation is present in the one of the air intake system and the EGR system when the humidity is greater than a predetermined humidity.

2. The condensation monitoring system of claim 1 further comprising a water estimation module that estimates a fraction of water in gas in the one of the air intake system and the EGR system,
   wherein the humidity estimation module estimates the humidity based on the fraction of water, a pressure in the system, and a saturated vapor pressure of the gas.

3. The condensation monitoring system of claim 2 wherein the humidity estimation module estimates the humidity based on a product of the fraction of water and a quotient of the pressure and the saturated vapor pressure.

4. The condensation monitoring system of claim 2 further comprising a carbon dioxide (CO2) determination module that determines a second fraction of CO2 in the gas, and a third fraction of CO2 in ambient air,
   wherein the water estimation module estimates a fourth fraction of water in the ambient air and estimates the fraction of water in the gas based on the second, third, and fourth fractions.

5. The condensation monitoring system of claim 4 wherein the water estimation module estimates the fraction of water in the gas further based on a ratio of hydrogen to carbon in fuel provided to the engine for combustion.

6. The condensation monitoring system of claim 1 wherein the condensation detection module alters a predetermined location in memory corresponding to the one of the air intake system and the EGR system when the humidity is greater than the predetermined humidity.

7. The condensation monitoring system of claim 1 wherein the humidity estimation module estimates a first humidity at a first location between an EGR cooler and a EGR valve of the EGR system, a second humidity at a second location near an inlet of a turbocharger compressor, and a third humidity at a third location near an outlet of an aftercooler, and
wherein the condensation detection module generates the condensation signal when at least one of the first, second, and third humidities is greater than the predetermined humidity.

8. The condensation monitoring system of claim 7 wherein the condensation detection module alters a predetermined location in memory corresponding to one of the first, second, and third locations when one of the first, second, and third humidities is greater than the predetermined humidity, respectively.

9. A condensation monitoring method for a vehicle, comprising:
estimating, using a humidity estimation module, a humidity in one of an air intake system and an exhaust gas recirculation (EGR) system associated with an engine of the vehicle; and
generating, using a condensation detection module, a condensation signal indicating that condensation is present in the one of the air intake system and the EGR system when the humidity is greater than a predetermined humidity.

10. The condensation monitoring method of claim 9 further comprising:
estimating a fraction of water in gas in the one of the air intake system and the EGR system; and
estimating the humidity based on the fraction of water, a pressure in the system, and a saturated vapor pressure of the gas.

11. The condensation monitoring method of claim 10 further comprising estimating the humidity based on a product of the fraction of water and a quotient of the pressure and the saturated vapor pressure.

12. The condensation monitoring method of claim 10 further comprising:
determining a second fraction of $CO_2$ in the gas, and a third fraction of $CO_2$ in ambient air; and
estimating a fourth fraction of water in the ambient air and estimates the fraction of water in the gas based on the second, third, and fourth fractions.

13. The condensation monitoring method of claim 12 further comprising estimating the fraction of water in the gas further based on a ratio of hydrogen to carbon in fuel provided to the engine for combustion.

14. The condensation monitoring method of claim 9 further comprising altering a predetermined location in memory corresponding to the one of the air intake system and the EGR system when the humidity is greater than the predetermined humidity.

15. The condensation monitoring method of claim 9 further comprising:
estimating a first humidity at a first location between an EGR cooler and a EGR valve of the EGR system;
estimating a second humidity at a second location near an inlet of a turbocharger compressor;
estimating a third humidity at a third location near an outlet of an aftercooler; and
generating the condensation signal when at least one of the first, second, and third humidities is greater than the predetermined humidity.

16. The condensation monitoring method of claim 15 further comprising altering a predetermined location in memory corresponding to one of the first, second, and third locations when one of the first, second, and third humidities is greater than the predetermined humidity, respectively.

* * * * *